(12) United States Patent
Anvaripour et al.

(10) Patent No.: US 11,544,921 B1
(45) Date of Patent: Jan. 3, 2023

(54) AUGMENTED REALITY ITEMS BASED ON SCAN

(71) Applicant: Snap Inc., Santa Monica, CA (US)

(72) Inventors: Kaveh Anvaripour, Santa Monica, CA (US); Nathan Kenneth Boyd, Los Angeles, CA (US); Hao Hu, Bellvue, WA (US); Celia Nicole Mourkogiannis, Los Angeles, CA (US); Kevin Dechau Tang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 146 days.

(21) Appl. No.: 16/700,415

(22) Filed: Dec. 2, 2019

Related U.S. Application Data

(60) Provisional application No. 62/939,356, filed on Nov. 22, 2019.

(51) Int. Cl.
| | |
|---|---|
| *G06T 11/00* | (2006.01) |
| *H04N 5/232* | (2006.01) |
| *H04L 51/04* | (2022.01) |
| *G06K 9/62* | (2022.01) |
| *G06V 40/10* | (2022.01) |
| *G06F 3/0482* | (2013.01) |
| *G06V 20/20* | (2022.01) |

(52) U.S. Cl.
CPC ........... *G06V 20/20* (2022.01); *G06K 9/6267* (2013.01); *G06T 11/00* (2013.01); *G06V 40/10* (2022.01); *H04L 51/04* (2013.01); *H04N 5/232933* (2018.08); *H04N 5/232939* (2018.08); *G06F 3/0482* (2013.01); *G06T 2200/24* (2013.01)

(58) Field of Classification Search
CPC ............ G06K 9/00671; G06K 9/6267; G06K 9/00362; G06T 11/00; G06T 2200/24; H04N 5/232939; H04N 5/232933; H04L 51/04; G06F 3/0482; G06V 20/20
USPC ......................................................... 345/633
See application file for complete search history.

(56) References Cited

U.S. PATENT DOCUMENTS

| | | | |
|---|---|---|---|
| 8,976,197 B1* | 3/2015 | Leber ...................... | G06F 3/048 345/633 |
| 2012/0194554 A1* | 8/2012 | Kaino .............. | G08B 13/19621 345/633 |
| 2013/0085345 A1* | 4/2013 | Geisner .................. | G06Q 30/00 600/300 |
| 2014/0002472 A1* | 1/2014 | Sobeski ................. | G09G 5/026 345/589 |
| 2014/0100997 A1* | 4/2014 | Mayerle ............. | G06Q 30/0276 705/27.2 |

(Continued)

*Primary Examiner* — Jennifer Mehmood
*Assistant Examiner* — Kim Thanh T Tran
(74) *Attorney, Agent, or Firm* — Schwegman Lundberg & Woessner, P.A.

(57) ABSTRACT

Systems and methods are provided for performing operations including receiving, via a messaging application, a request to scan an image captured by a camera of the user device; determining an attribute of an object depicted in the image; identifying, from a plurality of augmented reality items, an augmented reality item that is associated with the attribute of the object; combining the identified augmented reality item with the image captured by the camera; and displaying, via the messaging application, the image captured by the camera combined with the identified augmented reality item.

20 Claims, 10 Drawing Sheets

(56) References Cited

U.S. PATENT DOCUMENTS

| | | | |
|---|---|---|---|
| 2015/0062165 A1* | 3/2015 | Saito | G02B 27/017 |
| | | | 345/633 |
| 2016/0164809 A1* | 6/2016 | Krug | G06F 3/04817 |
| | | | 715/752 |
| 2018/0107876 A1* | 4/2018 | Lee | G06T 11/00 |
| 2018/0300916 A1* | 10/2018 | Barnett | G06F 3/04883 |
| 2019/0102523 A1* | 4/2019 | Buckley | G06T 19/006 |
| 2019/0244425 A1* | 8/2019 | Koohmarey | G06T 19/006 |
| 2019/0377894 A1* | 12/2019 | Jang | H04L 67/38 |
| 2020/0066044 A1* | 2/2020 | Stahl | G06T 19/006 |

* cited by examiner

AUGMENTED REALITY ITEMS BASED ON SCAN

CROSS-REFERENCE TO RELATED APPLICATION

The present disclosure claims the benefit of U.S. Provisional Application No. 62/939,356, filed Nov. 22, 2019, which is hereby incorporated by reference in its entirety.

TECHNICAL FIELD

The present disclosure relates generally to providing graphical elements using a messaging application.

BACKGROUND

Modern day user devices provide messaging applications that allow users to exchange messages with one another. Such messaging applications have recently started incorporating graphics in such communications. Users can select between various predetermined graphics to incorporate into their communications.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
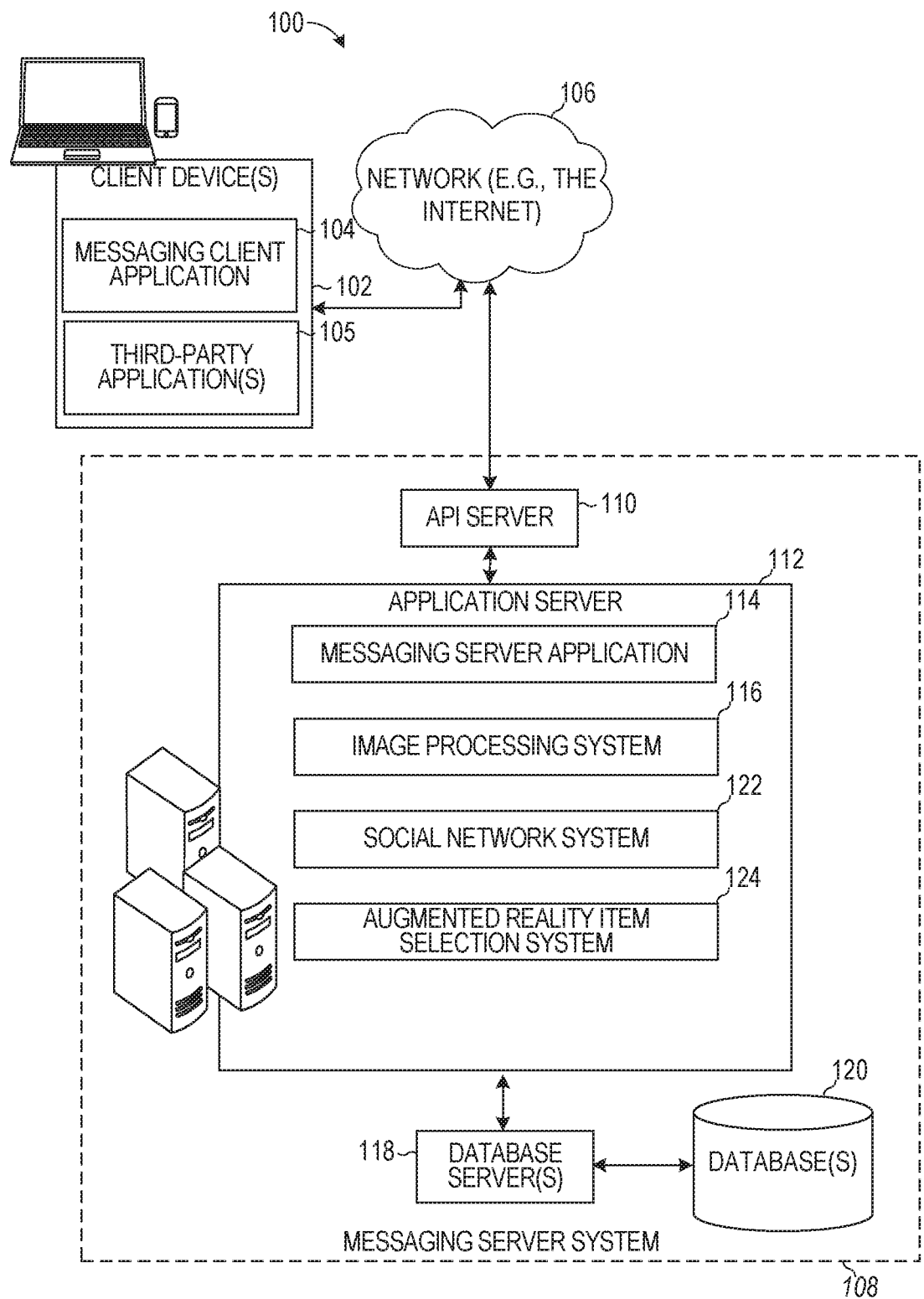
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users exchange messages with each other using messaging applications. Such applications allow users to select from a predefined list of images to send to one another. Users are increasingly communicating with each other using such images to convey their thoughts. However, finding the right images to convey a particular thought can be tedious and time consuming. Specifically, the user has to manually search using keywords for a particular image that conveys a given message. This requires navigating through multiple pages of information until the desired image is found. Given the complexity and amount of time it takes to find the right image, users become discouraged from communicating using the images, which results in a waste of resources or lack of use.

The disclosed embodiments improve the efficiency of using the electronic device by providing a system that intelligently selects and presents augmented reality items for a user to use to augment a captured image to be shared with another user in a messaging application based on attributes of an image captured by the user. Specifically, according to the disclosed embodiments, a messaging application implemented by one or more processors of a user device receives a request to scan an image captured by a camera of the user device and determines an attribute of an object depicted in the image. The disclosed embodiments identify, from a plurality of augmented reality items, an augmented reality item that is associated with the attribute of the object and combine into a display the identified augmented reality item with the image captured by the camera.

As an example, the user may point a camera of a user device, such as a mobile phone, towards an object, such as a movie poster, a mathematical (math) problem book, animal or body part. In response, the disclosed embodiments determine an attribute of the object and present one or more augmented reality items, such as graphical elements, on the image that depicts the object. Specifically, if the object is a movie poster, the disclosed embodiments retrieves one or more media items related to the movie poster and augment or replace one or more portions of the movie poster with the retrieved media items. As another example, if the object is an animal, the disclosed embodiments retrieve one or more visual graphical elements suitable for presentation on top of the animal or related to the animal and present the visual graphical elements on top of the animal. In some cases, a menu of multiple augmented reality items is presented, where each item in the menu is associated with the same attribute of the object. The user can navigate through the menu of augmented reality items to choose one to combine and augment the captured image.

In this way, the disclosed embodiments improve the efficiency of using the electronic device by reducing the number of screens and interfaces a user has to navigate through to find an augmented reality item to augment an image captured by the user to then share with other users. This is done by determining an attribute of an object depicted in an image captured by the user device with the messaging application and then searching for augmented reality items that are associated with the attribute for presentation to the user. This reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access an augmented reality item selection system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. In an embodiment, the third-party application 105 can be accessed by the client device 102 to perform various activities and interactions, such as listening to music, videos, track exercises, view graphical elements (e.g., stickers), shop for physical items or goods, communicate with other users, and so forth.

As an example, the third-party application 105 can be a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

In some embodiments, the messaging client application 104 activates a camera of the client device 102. The messaging client application 104 allows a user to request to scan one or more items in a camera feed captured by the camera. For example, the messaging client application 104 may receive a user selection of a dedicated scan option presented together with the camera feed. Alternatively, the messaging client application 104 may detect physical contact between a finger of the user's hand and a region of the touch screen for a threshold period of time. For example, the messaging client application 104 determines that the user touched and held their finger on the screen for more than three seconds. In response, the messaging client application 104 captures an image being displayed on the screen and process the image to identify one or more objects in the image. In some embodiments, the messaging client application 104 uses one or more trained classifiers and/or environmental factors to identify the objects in the image.

In some implementations, as different objects are identified in the image during the scan, the messaging client application 104 adds the identified objects to a displayed list of objects. For example, the image scan may take five seconds to complete. During the first two seconds, the messaging client application 104 may identify a table in the captured image and, in response, may present the word "table" in a list on top of the captured image. After three seconds of scanning the image, the messaging client application 104 may identify a book in the captured image. In response, the messaging client application 104 may add the word "book" next to the table in the list. After the messaging client application 104 completes the scan, the messaging client application 104 may identify five items and may display each item in the list on top of the image in the order in which the item was identified.

After identifying all the items in the image, the messaging client application 104 may rank the items by relevance and select one of the items as a detected object depicted in the image. The messaging client application 104 may process the object to retrieve one or more attributes of the object. For example, the messaging client application 104 retrieves a book title, an object type indicating the object is a book, a keyword on the book, and so forth. The messaging client application 104 may search a database of augmented reality items to identify one or more augmented reality items associated with the retrieved one or more attributes. The messaging client application 104 may rank the identified augmented reality items and automatically select and activate a given one of the augmented reality items. The activation of the given augmented reality item may cause one or more graphical elements of the augmented reality item to be combined with the captured image and presented in a particular portion of the captured image. In some implementations, the one or more graphical elements are positioned in proximity to the object that has been selected and that is associated with the given augmented reality item.

The messaging client application 104 may present a menu on top of the captured image that lists all of the identified augmented reality items. The given augmented reality item may be positioned first in the menu and visually distinguished from the remaining augmented reality items to indicate to the user that the given augmented reality item is currently active. The menu may include a plurality of options for activating each augmented reality item. The user can browse through the menu to select and activate a different augmented reality item.

As an example, the messaging client application 104 determines that the object in the captured image is a food item (e.g., a hamburger or pizza). In response, the messaging client application 104 retrieves an augmented reality item that includes one or more graphical elements that look like the food item (e.g., animated images of hamburgers or pizzas). The messaging client application 104 presents the one or more graphical elements around the food item or on top of the food item. The one or more graphical elements may be animated to appear to be circling around the food item.

As another example, the messaging client application 104 determines that the object in the captured image is a mathematical problem item (e.g., a math problem written on a piece of paper). In response, the messaging client application 104 employs a mathematical problem solver application to obtain a solution to the mathematical problem. The messaging client application 104 retrieves an augmented reality item that includes one or more graphical elements that depict the solution to the mathematical problem. The messaging client application 104 presents the one or more graphical elements around the mathematical problem (e.g., under the problem or next to an equal sign of the mathematical problem).

As another example, the messaging client application 104 determines that the object in the captured image is a movie or media item (e.g., a picture of cover art of a media item) in response, the messaging client application 104 retrieves an augmented reality item that includes one or more graphical elements that are associated with the movie or media item. The messaging client application 104 presents the one or more graphical elements around the movie or media item or on top of the movie or media item. In particular, if the cover art includes a picture of a lion, the augmented reality item includes a graphical element that animates a lion and replaces the picture of the lion in the cover art with the animated lion of the graphical element.

As another example, the messaging client application 104 determines that the object in the captured image is the sky in a picture of a landscape. In response, the messaging client application 104 employs a weather application to current weather information at the geographical location of the client device 102. The messaging client application 104 retrieves an augmented reality item that includes one or more graphical elements that depict the weather. The messaging client application 104 presents the one or more graphical elements on top of the sky.

As another example, the messaging client application 104 presents augmented reality items based on a cultural interpretation of the selected object. In particular, the messaging client application 104 determines that the object in the captured image is a pumpkin. In response, the messaging client application 104 accesses a calendar to determine the current date. The messaging client application 104 determines that a national holiday (e.g., Halloween) is within a predetermined time period (e.g., one week before and/or after) the current date. The messaging client application 104 accesses a list of items associated with the national holiday and determine that a pumpkin is on the list of items. In response, the messaging client application 104 retrieves an augmented reality item that includes one or more graphical elements (e.g., scary items or spiders) associated with the national holiday. The messaging client application 104 presents the one or more graphical elements on the captured image.

In some embodiments, the messaging client application 104 identifies supplemental content associated with the selected object. The supplemental content may include non-creative content, such as information about the object, information about environmental factors (e.g., weather information, geolocation information, movie times, plant information, and so forth) associated with the client device 102, purchase information, and so forth. The messaging client application 104 may present the identified supplemental content in one or more cards at another portion of the display on top of the captured image. The cards displaying the supplemental content may be stacked on top of one another. For example, the menu of augmented reality items may be presented at the bottom of the display and the supplemental content may be presented at the top of the display.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) (e.g., graphical user interfaces) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112.

The API server 110 exposes various functions supported by the application server 112, including account registration; login functionality; the sending of messages, via the application server 112, from a particular messaging client application 104 to another messaging client application 104 or third-party application 105; the sending of media files (e.g., graphical elements, images or video) from a messaging client application 104 to a messaging server application 114, and for possible access by another messaging client application 104 or third-party application 105; a graphical element list; the setting of a collection of media data (e.g., story); the retrieval of such collections; the retrieval of a list of friends of a user of a client device 102; maintaining augmented reality items; the retrieval of messages and content; the adding and deleting of friends to a social graph; the location of friends within a social graph; access to user conversation data; access to avatar information stored on messaging server system 108; and opening an application event relating to the messaging client application 104).

The application server 112 hosts a number of applications and subsystems, including a messaging server application 114, an image processing system 116, a social network system 122, and the augmented reality item selection system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor-and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114, A portion of the image processing system 116 may also be implemented by the augmented reality item selection system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The augmented reality item selection system 124 generates a list of augmented reality items based on one or more images captured by the messaging client application 104. The augmented reality item selection system 124 identifies an object depicted in the one or more images and determines one or more attributes of the object. The augmented reality item selection system 124 searches for one or more augmented reality items (e.g., virtual objects) that are associated with the one or more attributes of the object. The augmented reality item selection system 124 ranks the one or more augmented reality items and automatically activates the highest ranked augmented reality item. As a result, the augmented reality item selection system 124 causes one or more virtual objects or graphical elements of the highest ranked augmented reality item to be presented on top of the captured image.

The application server 112 is communicatively coupled to a database server 118, which facilitates access to a database 120, in which is stored data associated with messages processed by the messaging server application 114. Database 120 may be a third-party database. For example, the application server 112 may be associated with a first entity, and the database 120 or a portion of the database 120 may be associated and hosted by a second different entity. In some implementations, database 120 stores user data that the first entity collects about various each of the users of a service provided by the first entity. For example, the user data includes user names, phone numbers, passwords, addresses, friends, activity information, preferences, videos or content consumed by the user, and so forth.

Figure 2:
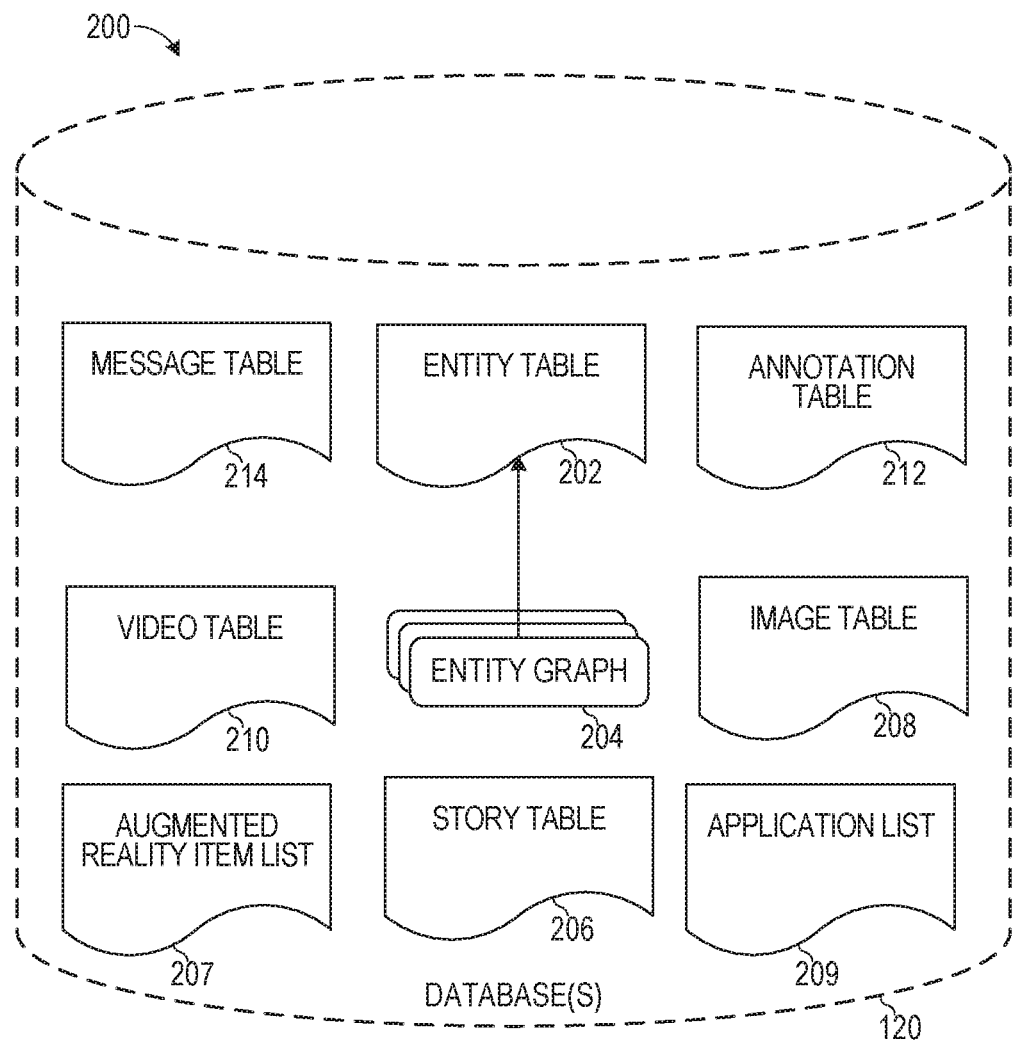
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood. or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "LENS" data. A "LENS" may be a real-time special effect and sound that may be added to an image or a video. A LENS is also referred to as an augmented reality item.

As described above, LENSES, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple LENSES, a user can use a single video clip with multiple LENSES to see how the different LENSES will modify the stored clip. For example, multiple LENSES that apply different pseudorandom movement models can be applied to the same content by selecting different LENSES for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different LENSES will look within different windows in a display at the same time. This can, for example, enable multiple windows with different pseudo-random animations to be viewed on a display at the same time.

Data and various systems using LENSES or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). LENS data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Augmented reality item list 207 stores augmented reality items available for selection and activation by the messaging client application 104. Each augmented reality item in the augmented reality item list 207 is associated with one or more object attributes. Each augmented reality item in the augmented reality item list 207 may also be associated with one or more keywords. In an embodiment, the messaging client application 104 searches the object attributes and/or keywords stored in the augmented reality item list 207 to identify one or more augmented reality items associated with a scanned object or an object identified in a captured image or keyword detected in the captured image. Each augmented reality item stored in the augmented reality item list 207 includes one or more graphical elements or virtual objects which may or may not be animated. Each augmented reality item also includes instructions on where to position the graphical elements or virtual objects relative to other objects depicted in the captured image.

Application list 209 stores a list of all applications installed on a given client device 102. As new applications are installed on the given client device 102, the client device updates the application list 209 with the name and identity of the installed application. Application list 209 also stores a list of all the applications that are configured to share authentication information with the messaging client application 104 (e.g., applications that are connected with the messaging client application 104 and/or that can be selected to be connected with the messaging client application 104).

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
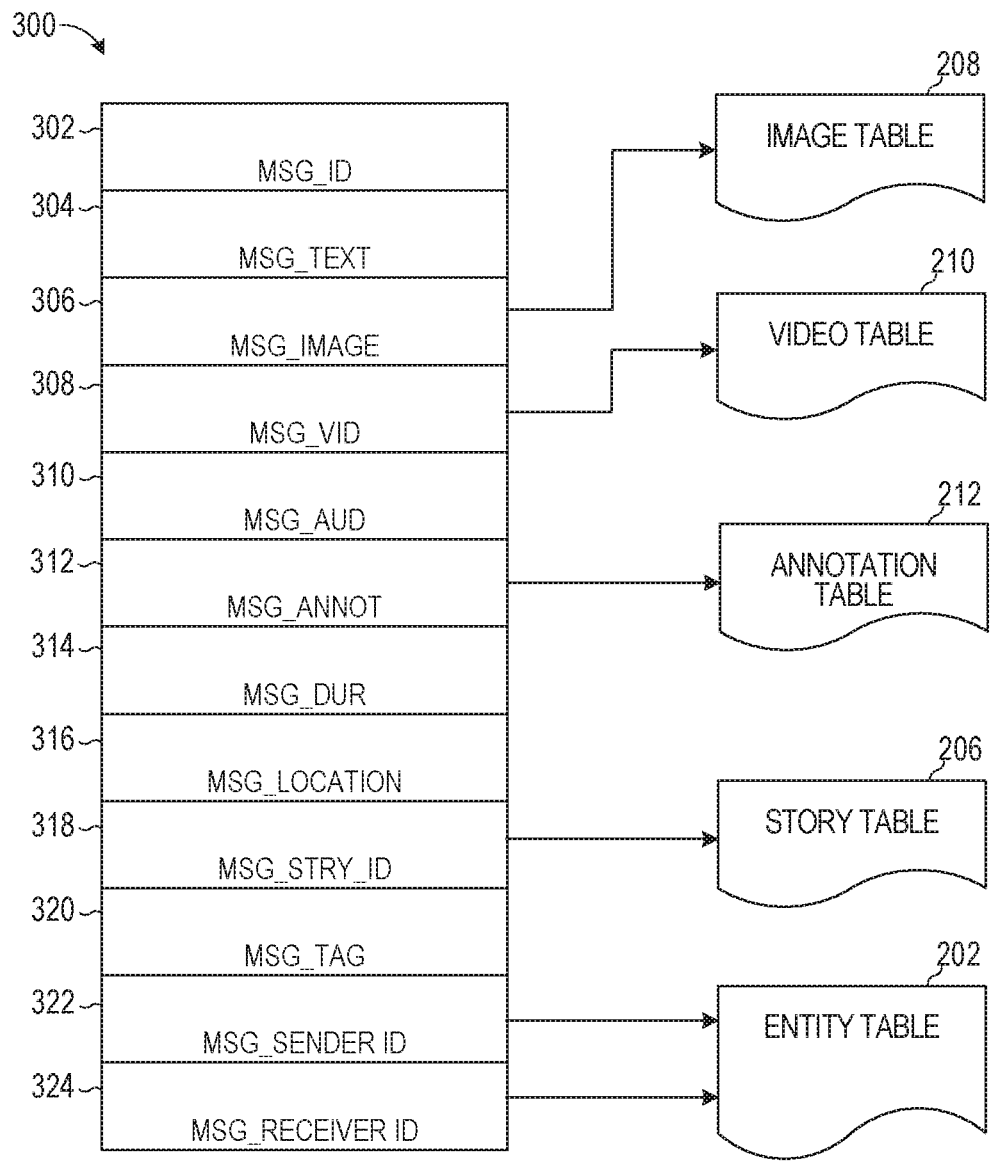
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.
- A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
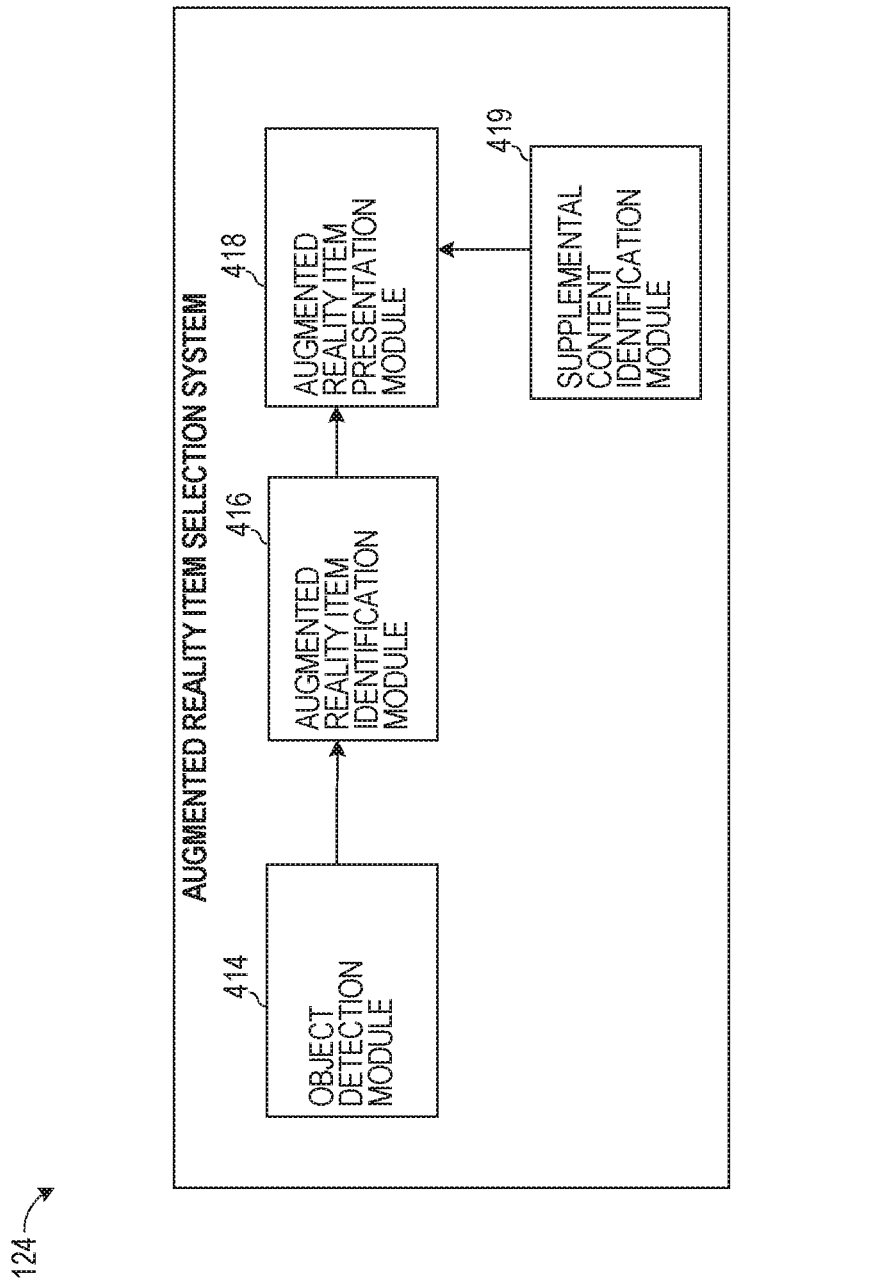
FIG. 4 is a block diagram showing an example augmented reality item selection system, according to example embodiments.

FIG. 4 is a block diagram showing an example augmented reality item selection system 124, according to example embodiments. Augmented reality item selection system 124 includes an object detection module 414, an augmented reality item identification module 416, an augmented reality item presentation module 418, and supplemental content identification module 419.

After a user provides a request to scan an object depicted in a captured image (or automatically without a specific request from the user), the messaging client application 104 provides the captured image to the object detection module 414. The object detection module 414 may employ one or more object classifiers to identify objects depicted in the image. As each object is detected, the object detection module 414 communicates an identifier (e.g., name) of the detected object to the messaging client application 104. The messaging client application 104 presents the identifier of the detected object in a list on top of or next to the captured image as the image continues to be scanned. As additional objects are detected, the messaging client application 104 adds the identifiers of the additional objects to the list. In this way, the user is informed about progress of scanning the captured image for objects.

The object detection module 414 obtains one or more attributes for each detected object. For example, the object detection module 414 retrieves an attribute indicating an object type (e.g., animal, body part, book, physical product, sky region, keyword, mathematical problem, and so forth). The object detection module 414 may also receive one or more environmental factors from the messaging client application 104 that identify the weather, geographical location, time, and so forth around the client device 102. In one example, the object detection module 414 ranks the retrieved attributes based on relevance, such as based on their association with the one or more environmental factors. Other machine learning techniques may be employed to select and rank retrieved attributes. The object detection module 414 may select an object from the list of objects detected in the captured image that is associated with the highest ranked attributes. In some cases, the object detection module 414 determines that one of the attributes corresponds to a keyword that has been sponsored by a third-party. Namely, third parties may sponsor or pay for certain keywords to be ranked higher than others. In response to determining that a given attribute corresponds to a sponsored keyword, the object detection module 414 ranks that attribute higher than all other attributes, The object detection module 414 provides the selected object attributes to the augmented reality item identification module 416. In some cases, the object detection module 414 provides the selected object attributes to the supplemental content identification module 419.

The augmented reality item identification module 416 searches the augmented reality item list 207 to identify one or more augmented reality items that are associated with the object attributes provided by the object detection module 414. For example, the object attribute may indicate that the object is a particular animal. In such cases, the augmented reality item identification module 416 identifies a set of augmented reality items that are associated with that particular animal. For example, the object attribute may indicate that the object is a particular body part. In such cases, the augmented reality item identification module 416 identifies a set of augmented reality items that are associated with that particular body part. For example, the object attribute may indicate that the object is a sky region of a landscape. In such cases, the augmented reality item identification module 416 identifies a set of augmented reality items that are associated with weather.

In some embodiments, the augmented reality item identification module 416 accesses one or more third-party applications 105 to determine, select, and modify one or more graphical elements of a given augmented reality item that is identified based on the attributes of the object. Namely, one or more of the graphical elements of a given augmented reality item may need to be populated with information from a third-party application 105. For example, a weather augmented reality item may include one or more graphical elements that are selected, modified and animated according to the current weather at a given location determined by a weather application based on the geographical location of the client device 102. As another example, a mathematical augmented reality item may include one or more graphical elements that are selected, modified and animated to represent a solution to a mathematical problem determined by a third-party application 105 mathematical problem solver based on a mathematical problem depicted in the image captured by the client device 102, As another example, a product based augmented reality item may include one or more graphical elements that are selected, modified and animated to represent a price or purchase options determined by or available through a third-party application 105 based on an item or keyword depicted in the image captured by the client device 102.

The augmented reality item identification module 416 provides the list of matching augmented reality items to the augmented reality item presentation module 418. In some cases, the augmented reality item identification module 416 automatically selects for activation one of the matching augmented reality items that is most relevant or that is ranked higher than all other matching augmented reality items. In some cases, the augmented reality item that has been most recently created, that is most popular, that is sponsored, that is associated with a location that is closest to the client device 102, and/or any combination thereof may cause the augmented reality item to be ranked higher. Namely, the augmented reality item identification module 416 may take into account any one or combination of criteria including recency of creation, popularity, sponsorship, location, and/or other factors in ranking the augmented reality items. The augmented reality item presentation module 418 presents a menu with options for each of the matching augmented reality items together with (e.g., on top of) the captured image. Each option may enable a user to navigate to and select for activation a corresponding one of the matching augmented reality items. The augmented reality item presentation module 418 obtains one or more graphical elements or virtual objects of the activated augmented reality item. The augmented reality item presentation module 418 presents the obtained one or more graphical elements or virtual objects of the activated augmented reality item on top of, next to, or in replacement of, the given object in the captured image.

As an example, the augmented reality item presentation module 418 presents one or more graphical elements that look like a food item (e.g., animated images of hamburgers or pizzas) when the object detected by the object detection module 414 is the food item. The augmented reality item presentation module 418 may present the one or more graphical elements around the food item or on top of the food item. The one or more graphical elements may be animated to appear to be circling around the food item.

As another example, the augmented reality item presentation module 418 retrieves an augmented reality item that includes one or more graphical elements that depict a solution to a mathematical problem when the object detected by the object detection module 414 is a mathematical problem (e.g., a math problem written on a piece of paper or on a computer screen). The augmented reality item presentation module 418 presents the one or more graphical elements around the mathematical problem (e.g., under the problem or next to an equal sign of the mathematical problem).

As another example, the augmented reality item presentation module 418 presents one or more graphical elements around a movie or media item or on top of the movie or media item when the object detected by the object detection module 414 is a movie poster or cover art of a media item. In particular, if the movie poster includes a picture of a lion, the augmented reality item may include a graphical element that animates a lion and replaces the picture of the lion in the movie poster with the animated lion of the graphical element. The augmented reality item presentation module 418 may similarly present one or more graphical elements in a particular region of the captured image or all over the captured image when the object detected by the object detection module 414 is a particular sound. For example, the object detection module 414 determines that the sound corresponds to a particular song and, in response, the augmented reality item presentation module 418 presents one or more graphical elements that include lyrics of the song and/or other graphical elements associated with the song.

As another example, the augmented reality item presentation module 418 retrieves an augmented reality item that includes one or more graphical elements that depict weather at the location of the client device 102 when the object detected by the object detection module 414 is sky region of a landscape. The augmented reality item presentation module 418 presents the one or more graphical elements on top of the sky.

As another example, the augmented reality item presentation module 418 retrieves an augmented reality item that includes one or more graphical elements (e.g., scary items or spiders) associated with a national holiday when the object detected by the object detection module 414 is an item associated with the national holiday and when the national holiday takes place within a threshold period of time (e.g., a week before or after) of the current time.

In some embodiments, the augmented reality item presentation module 418 receives one or more supplemental content items from the supplemental content identification module 419. The augmented reality item presentation module 418 presents each of the received supplemental content items in a respective card in a separate portion of the screen than that on which the menu of augmented reality items is displayed. For example, the supplemental content items may be presented at the top of the screen on which the captured image is presented, and the menu of augmented reality items is presented at the bottom of the screen.

In one example, the supplemental content identification module 419 receives the one or more attributes from the object detection module 414. The supplemental content identification module 419 searches the Internet, a local database, one or more third-party applications 105, and/or other content sources for information associated with the one or more attributes. For example, if the one or more attributes indicate the object is a particular type of plant, the supplemental content identification module 419 may retrieve information from an online encyclopedia about the particular type of plant. The supplemental content identification module 419 generates a card with a picture of the plant and most relevant facts about the plant.

As another example, if the one or more attributes indicate the object is a movie poster, the supplemental content identification module 419 retrieves movie times from a local cinema relative to a current location of the client device 102 and generates a card identifying the cinema and the movie times. As another example, if the one or more attributes indicate the object is a sky region, the supplemental content identification module 419 retrieves weather information relative to a current location of the client device 102 and generates a card identifying the current weather and weather forecast. As another example, if the one or more attributes indicate the object is a sponsored keyword, the supplemental content identification module 419 may retrieve location information for the vendor or sponsor of the keyword relative to a current location of the client device 102 and generate a card identifying the vendor or sponsor and the location information of the vendor or sponsor. As another example, if the one or more attributes indicate the object is a song or media item, the supplemental content identification module 419 generates a card with an option that allows the user to purchase the song or media item.

Figure 5:
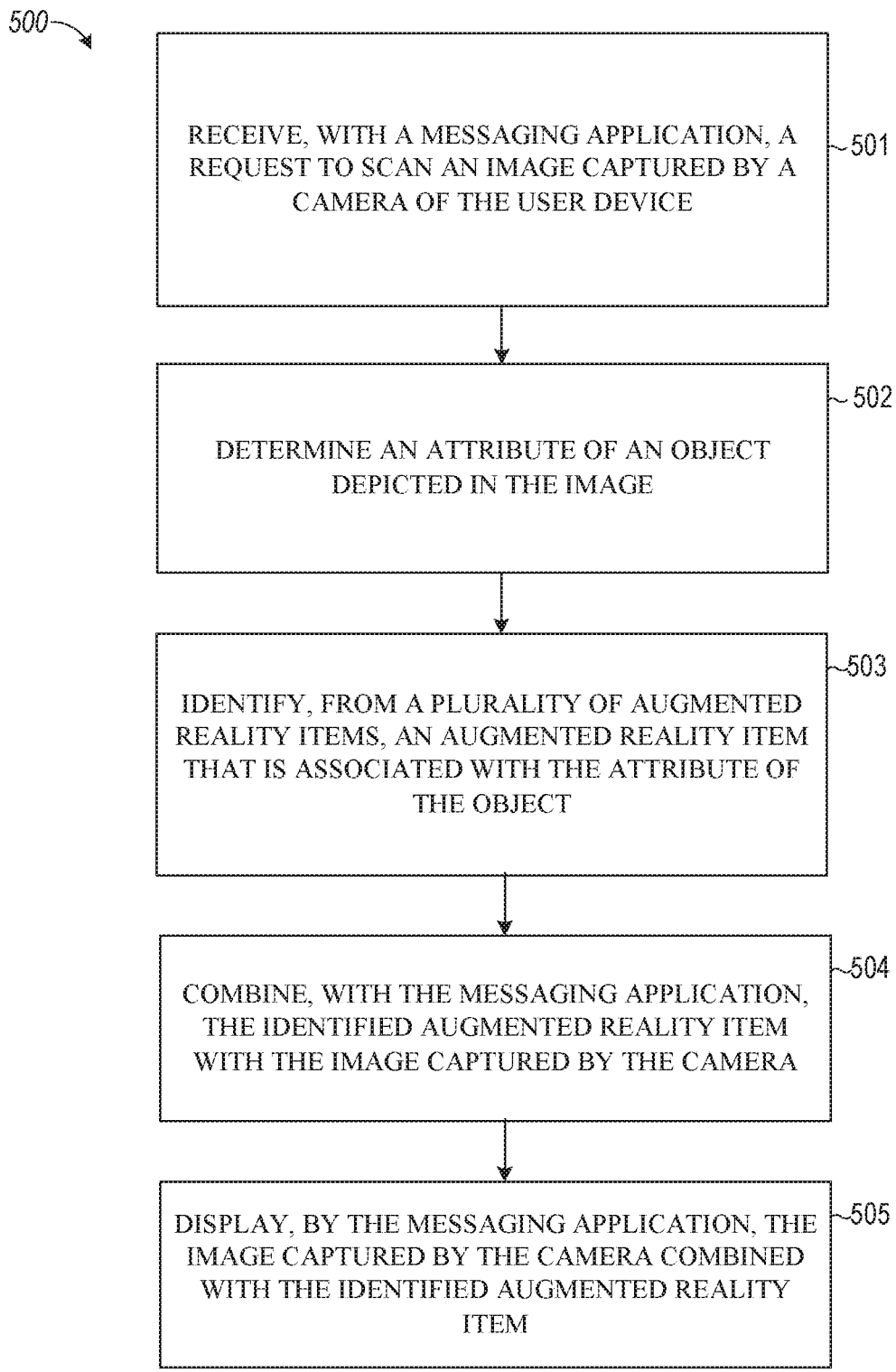
FIG. 5 is a flowchart illustrating example operations of the augmented reality item selection system, according to example embodiments.

FIG. 5 is a flowchart illustrating example operations of the augmented reality item selection system 124 in performing process 500, according to example embodiments. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the augmented reality item selection system 124. receives a request to scan an image captured by a camera of the user device. For example, the messaging client application 104 may receive a user selection of a dedicated scan option presented together with a camera feed of the camera. Alternatively, the messaging client application 104 may detect physical contact between a finger of the user's hand and a region of the touch screen for a threshold period of time. For example, the messaging client application 104 may determine that the user touched and held their finger on the screen for more than three seconds. In some cases, the augmented reality item selection system 124 processes images as they are captured by the camera of the client device 102 to identify objects and present relevant augmented reality items without an express user request for a scan to be performed.

At operation 502, the augmented reality item selection system 124 determines an attribute of an object depicted in the image. For example, the messaging client application 104 retrieves a book title, an object type indicating the object is a book, a keyword on the book, and so forth by inputting the image depicting the object into one or more trained object classifiers.

At operation 503, the augmented reality item selection system 124 identifies, from a plurality of augmented reality items, an augmented reality item that is associated with the attribute of the object. For example, the messaging client application 104 searches a database of augmented reality items to identify one or more augmented reality items associated with the determined attributes. In one example, the messaging client application 104 ranks the identified augmented reality items and automatically selects and activates a given one of the augmented reality items.

At operation 504, the augmented reality item selection system 124 combines the identified augmented reality item with the image captured by the camera. For example, the activation of the given augmented reality item causes one or more graphical elements of the augmented reality item to be combined with the captured image and presented in a particular portion of the captured image.

At operation 505, the augmented reality item selection system 124 displays the image captured by the camera combined with the identified augmented reality item. For example, the one or more graphical elements of the augmented reality item are positioned in close proximity to (or on top of) the object that has been selected and that is associated with the given augmented reality item. In one example embodiment, the one or more graphical elements are presented to replace the object that has been selected in the captured image.

Figure 6:
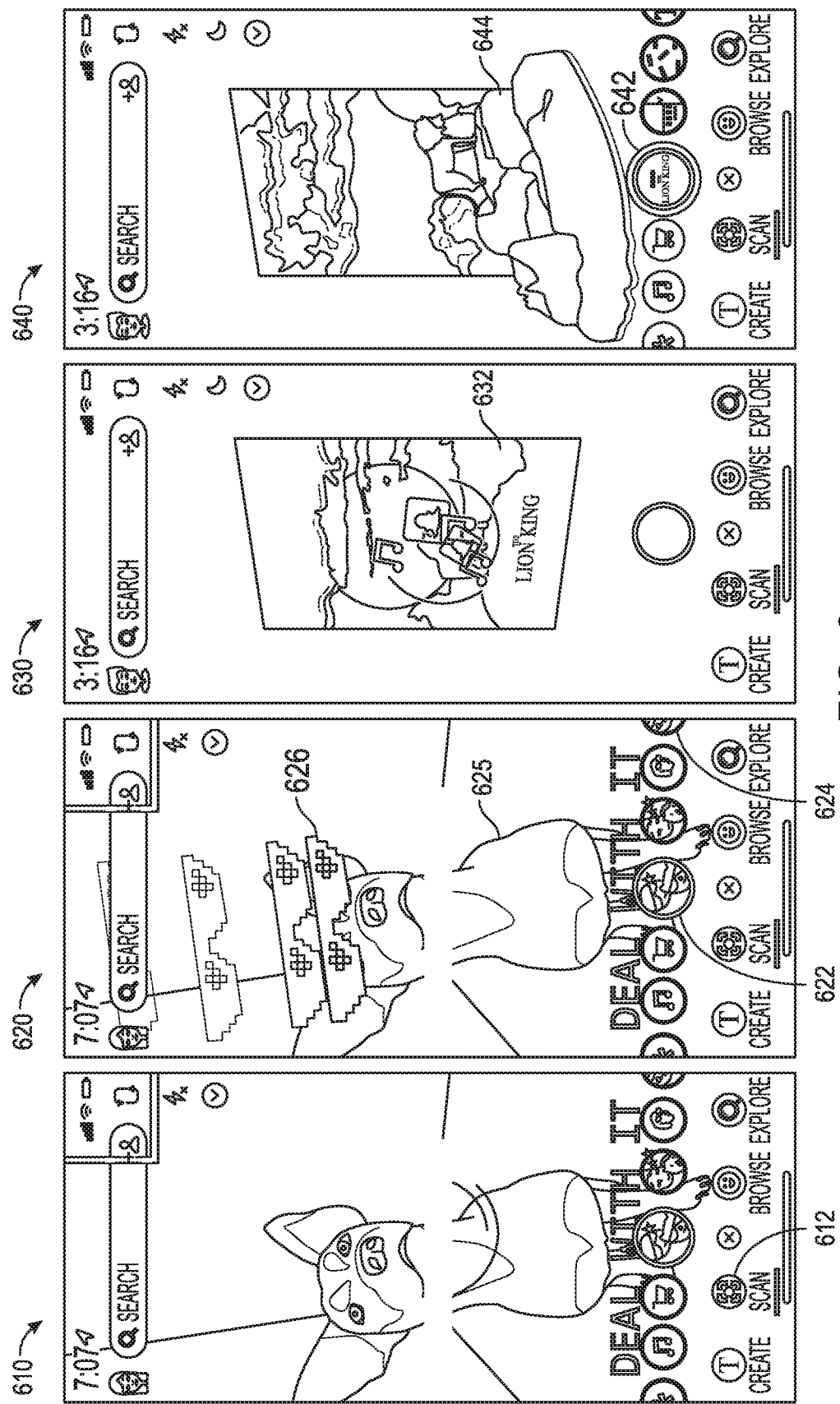
FIGS. 6-8 are illustrative inputs and outputs of the augmented reality item selection system, according to example embodiments.
Figure 7:
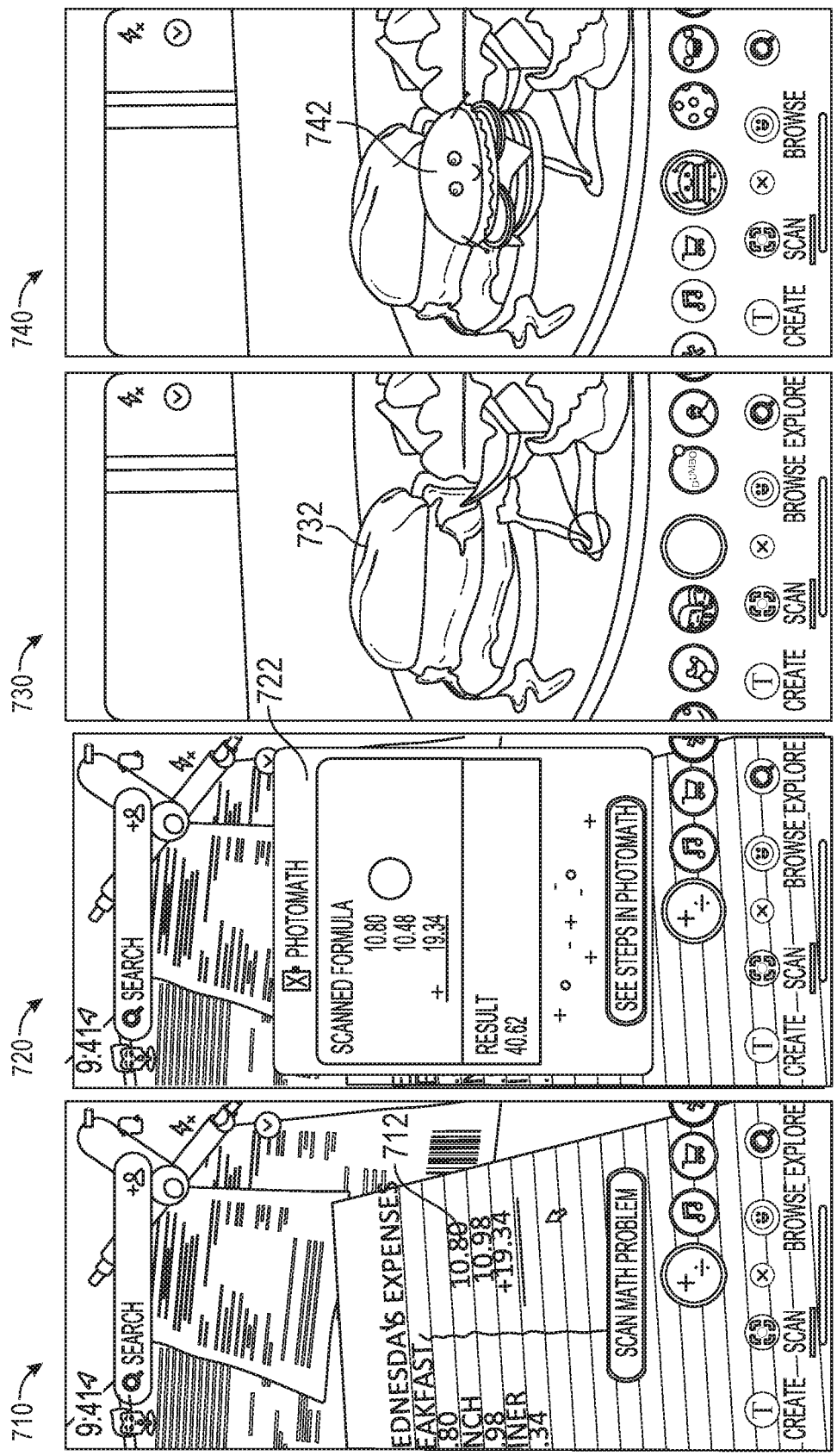
Figure 8:
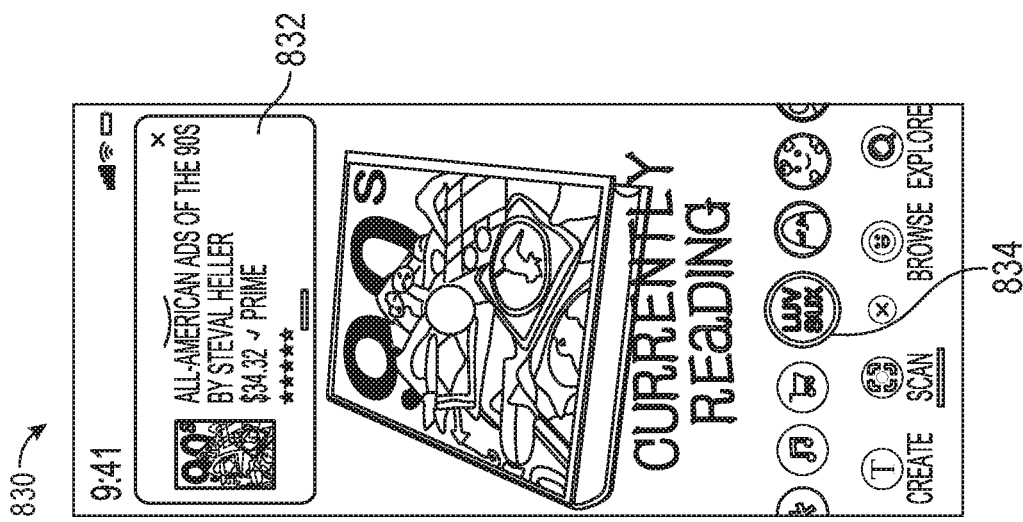
Figure 8:
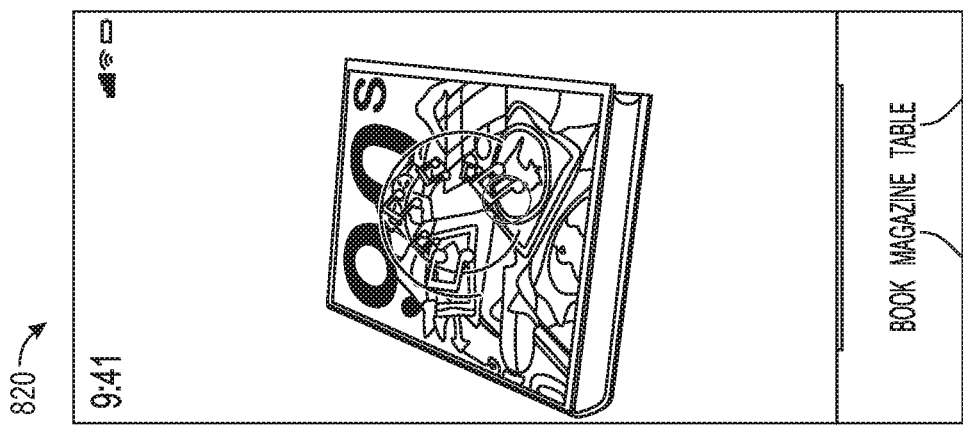
Figure 8:
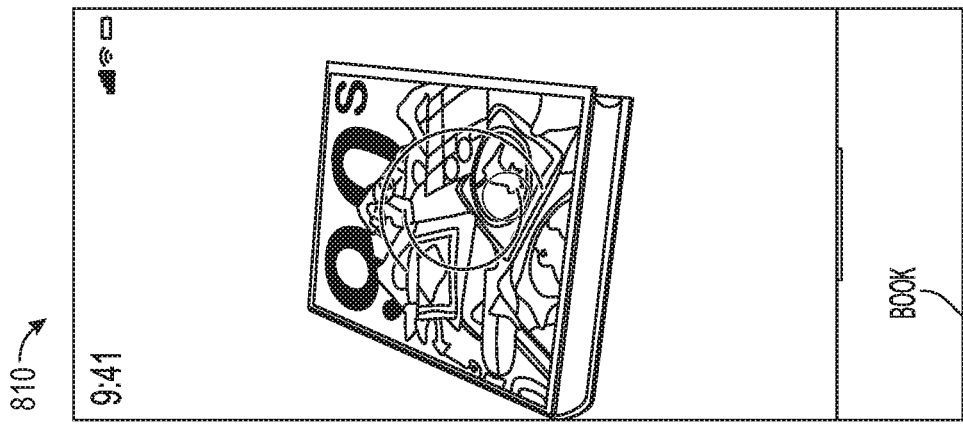

FIGS. 6-8 are illustrative inputs and outputs of the augmented reality item selection system 124, according to example embodiments. The messaging client application 104 may receive a user request to access a camera feed. In response, the messaging client application 104 presents a screen 610 in which a live video feed being captured by the camera of the client device 102 is presented. The messaging client application 104 receives a user request to scan an image captured by the camera (or automatically scans the image being received from a video feed of a camera). For example, the messaging client application 104 receives a user selection of scan option 612. Alternatively, the user taps and holds their finger on a predetermined portion of the screen 610 (e.g., the top of the screen 610) for a predefined amount of time (e.g., three seconds or more). In response, the messaging client application 104 captures an image in which an object 625 (e.g., a dog is presented). The messaging client application 104 retrieves a set of augmented reality items associated with attributes of the object 625. The messaging client application 104 presents in screen 620 a menu 624 that includes a plurality of options for accessing the set of augmented reality items associated with the attributes of the object 625. The messaging client application 104 automatically selects and activates a given augmented reality item of the plurality and identifies the activated augmented reality item in the menu 624 with an indicator 622.

The messaging client application 104 presents one or more graphical elements 626 combined with the image depicting the object 625. For example, the messaging client application 104 presents sunglasses on top of the dog object 625 presented in the captured image. The sunglasses may be animated as falling down on top of the dog's face.

In another example, the object 625 depicted in the image 630 is a cover art or cover art 632 of a movie. The messaging client application 104 retrieves one or more augmented reality items associated with the cover art or cover art 632. The messaging client application 104 indicates the activated augmented reality item with indicator 642 in screen 640. In this example, the movie poster or cover art 632 is replaced by one or more graphical elements associated with the movie. Specifically, a lion and clouds depicted in the movie poster or cover art 632 is replaced by animated and enhanced version of a lion and clouds 644 that extend outside the bounds of the movie poster or cover art 632. The clouds 644 may be animated and the lion may be animated to give a more realistic effect. Also, sounds may be added to enhance the realistic effect as part of the graphical elements associated with the augmented reality item.

In another example, shown in FIG. 7, the screen 710 depicts an object 712 that is a math problem written on a piece of paper. The messaging client application 104 may access a third-party application 105 (e.g., a mathematical problem solver application) to solve the math problem. The messaging client application 104 obtains a solution to the math problem and presents in screen 720 an augmented reality item with a graphical element 722 that depicts the solution, In another example, the screen 730 depicts an object 732 that is a food item (e.g., a hamburger). The messaging client application 104 presents in screen 740 an augmented reality item with a graphical element 742 that depicts an animated version of the food item. Graphical element 742 may circle around the object 732 or be statically positioned.

In one example embodiment, the user captures an image and send a message to another user of the messaging client application 104 that includes the captured image with at least one activated augmented reality item.

In some embodiments, as shown in FIG. 8, the messaging client application 104 presents a list of items that are identified in the captured image as each of the items is identified while the image is scanned and processed. Specifically, screen 810 shows a first identifier 812 (e,g., a name of the identified item, book) during an initial portion of the scan (e.g., after two seconds of scanning the image) and while the image is still being scanned. Then, during another segment of the scan, screen 820 presents second and third identifiers 822 and 824 that represent additional items identified in the captured image. The second identifier 822 (e.g., a name of the identified item, magazine) may first be presented after the first identifier 812 is presented. Then, the third identifier 824 (e.g., the name of the identified item, table) is presented after the first and second identifiers are presented.

In some embodiments, as shown in screen 830, the messaging client application 104 presents one or more cards 832 with supplemental information about the identified object together with the menu of augmented reality items and/or augmented reality item 834 that is activated. In some cases, the cards 832 are presented at the top of the screen 830 and the menu of augmented reality items is presented at the bottom of the screen 830. The user can tap a given one of the cards 832 to access the supplemental content presented in the card. The supplemental content may be an image, video, sound, text, hyperlink, animation, or any other suitable content associated with the object in the captured image.

Figure 9:
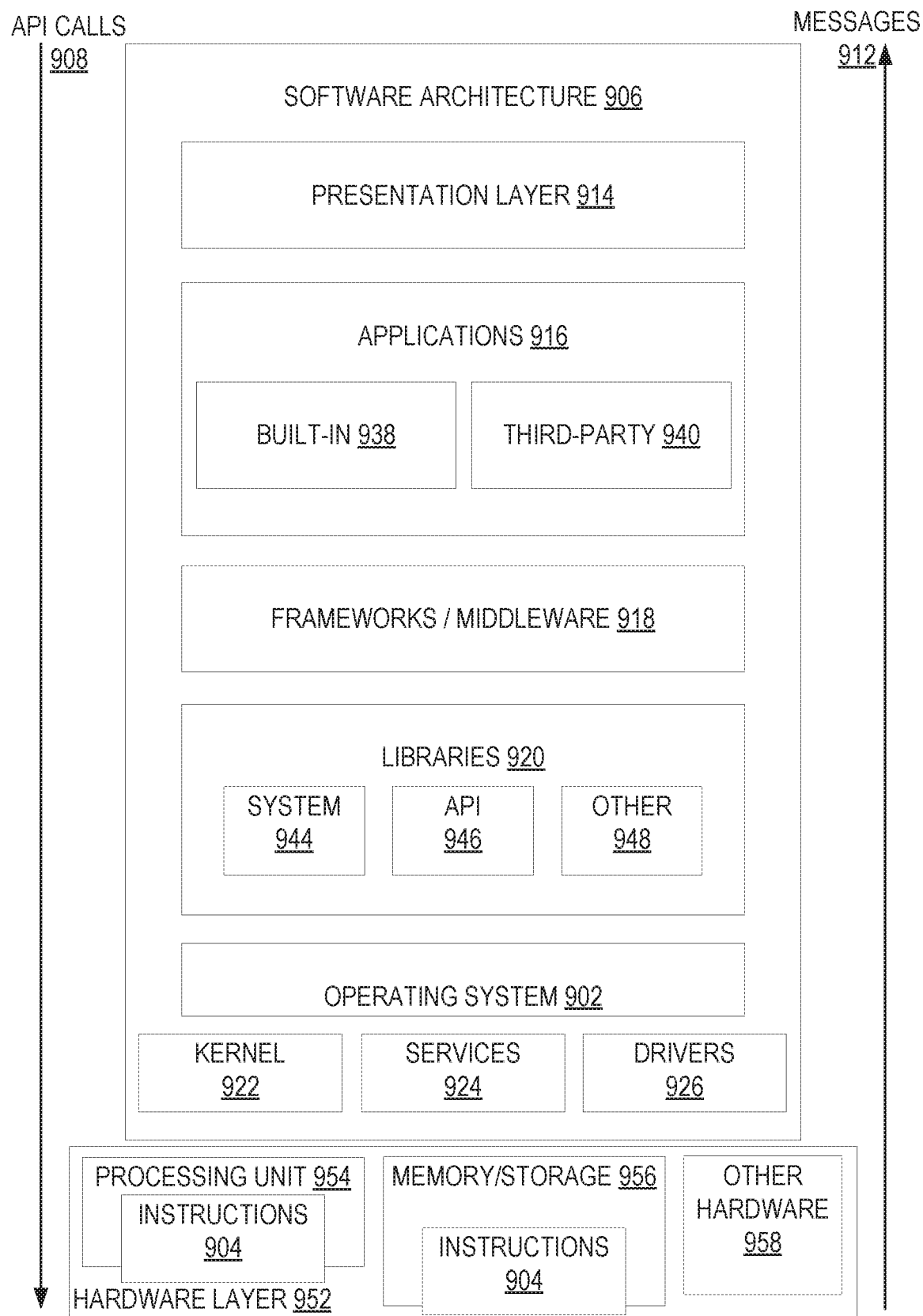
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926, The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
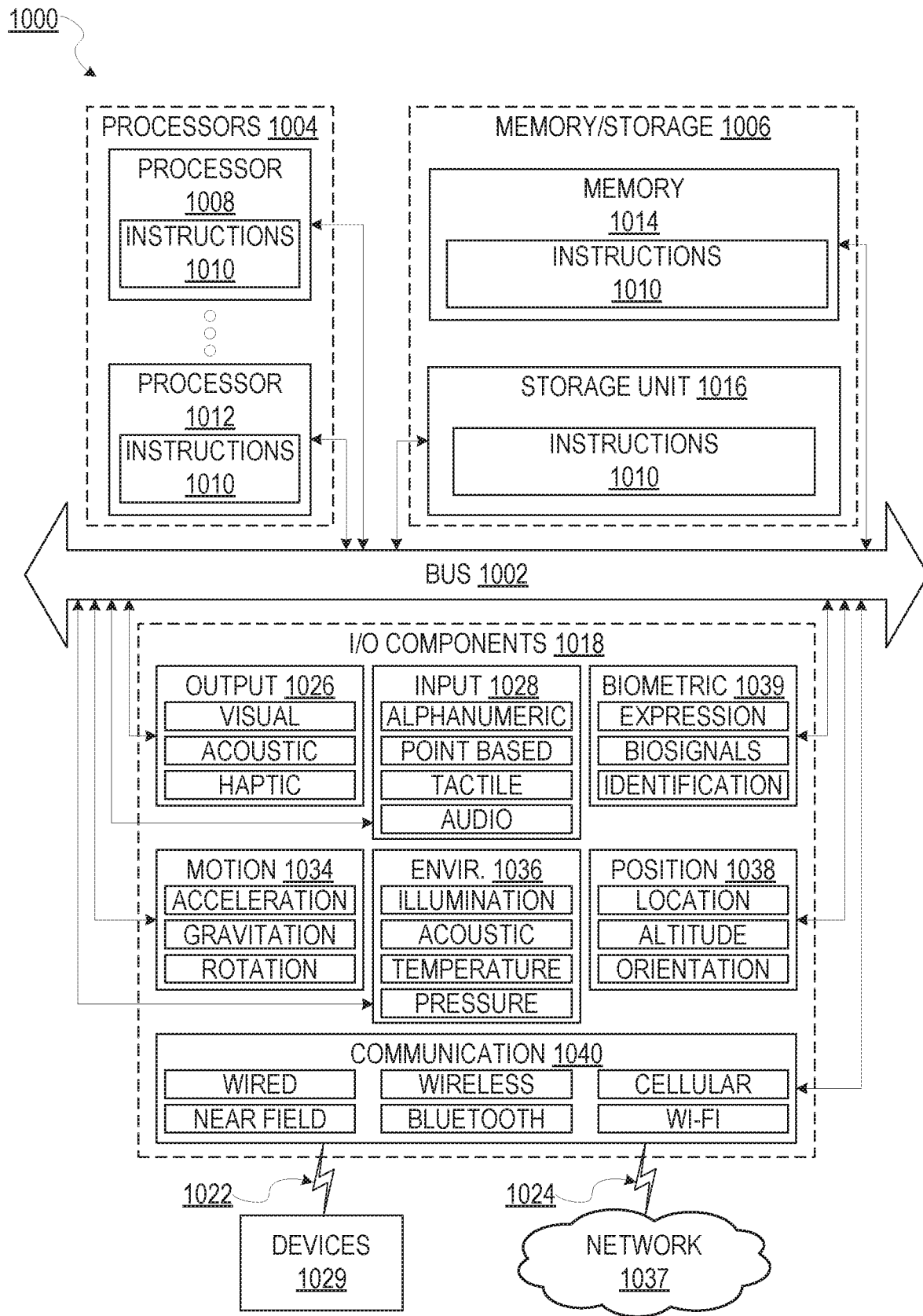
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e,g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC or any combination thereof. A processor may further be a multi-core processor having two or more independent processors (sometimes referred to as "cores") that may execute instructions contemporaneously.

"TIMSTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, via a messaging application implemented by one or more processors of a user device, a request to scan an image captured by a camera of the user device, the image captured by the camera depicting a plurality of objects;
   while the image is processed to identify the plurality of objects, receiving, from an object classifier, a first communication comprising a first identifier of a first object of the plurality of objects that is depicted in the image as each of the plurality of objects continues to be detected;
   in response to receiving the first communication, displaying a list comprising the first identifier of the first object;
   while the image continues to be processed after the first identifier is received, receiving, from the object classifier that generated the first communication, a second communication comprising a second identifier of a second object of the plurality of objects that is depicted in the image, the first and second communications being generated by the object classifier in response to the object classifier receiving and processing the image;
   in response to receiving the second communication, updating the list to add the second identifier of the second object, the first and second identifiers comprising textual descriptions of the first and second objects, respectively;
   determining an attribute of the first object depicted in the image;
   identifying, from a plurality of augmented reality items, an augmented reality item that is associated with the attribute of the first object;
   combining the identified augmented reality item with the image captured by the camera;
   displaying, via the messaging application, the image captured by the camera combined with the identified augmented reality item; and
   displaying, on top of the image, a menu that comprises a plurality of augmented reality options for accessing each of a respective identified augmented reality item associated with the attribute of the first object.

2. The method of claim 1, wherein receiving the request comprises:
   displaying a video stream captured by the camera; and
   receiving a selection of an on-screen scan option presented on top of the video stream to scan the image, the video stream comprising a sequence of frames one of which includes the image, wherein the image is captured in response to receiving a user selection of the on-screen scan option.

3. The method of claim 1, wherein receiving the request comprises:
   displaying a video stream captured by the camera;
   receiving input indicating contact with a touchscreen on which the video stream is presented;
   detecting that the contact is for a threshold period of time; and
   in response to receiving the input indicating contact for the threshold period of time, capturing the image included in the video stream.

4. The method of claim 1, further comprising:
   storing, in a database, an association between the plurality of augmented reality items and respective attributes of objects;
   determining that a given attribute of a first of the plurality of augmented reality items is associated with a sponsored keyword; and
   in response to determining that the given attribute of the first of the plurality of augmented reality items is associated with the sponsored keyword, increasing a ranking associated with the first of the plurality of augmented reality items.

5. The method of claim 1, wherein the attribute comprises a mathematical problem, and identifying, from a plurality of augmented reality items, the augmented reality item that is associated with the attribute of the first object comprises:
   inputting the mathematical problem into a mathematical problem solver; and
   obtaining a solution to the mathematical problem from the mathematical problem solver, wherein the augmented reality item comprises a visual display of the solution.

6. The method of claim 1, wherein the attribute comprises a marker, and identifying, from a plurality of augmented reality items, the augmented reality item that is associated with the attribute of the first object comprises:
identifying one or more media items related to the marker, wherein the augmented reality item comprises a visual display of the one or more media items related to the marker.

7. The method of claim 1, further comprising:
determining that the first object comprising a sky region of a landscape depicted in the image; and
in response to determining that the first object comprising the sky region, identifying the augmented reality item that is associated with weather.

8. The method of claim 1, wherein the attribute comprises a cultural interpretation of the first object, and wherein identifying, from a plurality of augmented reality items, the augmented reality item that is associated with the attribute of the first object comprises:
identifying a category related to the cultural interpretation; and
generating a list of augmented reality items that are associated with the category of media items, the list comprising the identified augmented reality item, wherein the augmented reality item comprises a visual display of one or more media items related to the identified category.

9. The method of claim 1, further comprising:
determining environmental factors associated with the user device comprising at least one of lighting conditions of the image, a geolocation of the user device, or a keyword, wherein the augmented reality item is further identified based on the environmental factors.

10. The method of claim 1, further comprising:
identifying a subset of augmented reality items that are associated with the attribute of the first object;
selecting the augmented reality item from the subset of augmented reality items associated with a highest rank; and
automatically activating the selected augmented reality item that is associated with the highest rank.

11. The method of claim 1, further comprising:
in response to receiving the first communication, displaying a list comprising the first identifier of the first object; and
in response to receiving the second communication, updating the list to add the second identifier of the second object, the first and second identifiers comprising textual descriptions of the first and second objects, respectively.

12. The method of claim 1, further comprising:
identifying a subset of augmented reality items that are associated with the attribute of the first object; and
automatically activating a given augmented reality item of the subset of augmented reality items that are associated with the attribute of the first object.

13. The method of claim 1, further comprising:
determining that a holiday is scheduled to occur within a threshold period of time from a current time; and
in response to determining that the holiday is scheduled to occur within the threshold period of time from the current time, retrieving the augmented reality item that includes one or more graphical elements that are associated with the holiday.

14. The method of claim 1, further comprising:
determining that the first object comprises an item associated with a holiday; and
in response to determining that the first object comprises an item associated with the holiday, retrieving the augmented reality item that includes one or more graphical elements that are associated with the holiday.

15. The method of claim 1, further comprising:
displaying on top of the image, in a first portion of a screen, a menu that comprises a plurality of augmented reality options to access a respective identified augmented reality item, wherein a given one augmented reality item is combined with the image in response to receiving a selection of the corresponding augmented reality option;
identifying supplemental content associated with the first object depicted in the image; and
displaying on top of the image, in a second portion of the screen, an overlay comprising the identified supplemental content associated with the first object.

16. The method of claim 15, wherein the supplemental content comprises at least one of:
current weather when the attribute associated with the first object is a sky;
movie times when the attribute associated with the first object is cover art of a movie;
a type of plant when the attribute associated with the first object indicates the first object is a plant;
an option to purchase a product when the attribute associated with the object indicates the first object is the product; or
an explanation or solution for a mathematical problem when the attribute associated with the first object indicates the first object is a mathematical problem.

17. A system comprising:
a processor of a computing device configured to perform operations comprising:
receiving, via a messaging application, a request to scan an image captured by a camera of the computing device, the image captured by the camera depicting a plurality of objects;
while the image is processed to identify the plurality of objects, receiving, from an object classifier, a first communication comprising a first identifier of a first object of the plurality of objects that is depicted in the image as each of the plurality of objects continues to be detected;
in response to receiving the first communication, displaying a list comprising the first identifier of the first object;
while the image continues to be processed after the first identifier is received, receiving, from the object classifier that generated the first communication, a second communication comprising a second identifier of a second object of the plurality of objects that is depicted in the image, the first and second communications being generated by the object classifier in response to the object classifier receiving and processing the image;
in response to receiving the second communication, updating the list to add the second identifier of the second object, the first and second identifiers comprising textual descriptions of the first and second objects, respectively;
determining an attribute of the first object depicted in the image;
identifying, from a plurality of augmented reality items, an augmented reality item that is associated with the attribute of the first object;
combining the identified augmented reality item with the image captured by the camera;

displaying, via the messaging application, the image captured by the camera combined with the identified augmented reality item; and displaying, on top of the image, a menu that comprises a plurality of augmented reality options for accessing each of a respective identified augmented reality item associated with the attribute of the first object.

18. The system of claim 17, the operations further comprising:

identifying a subset of augmented reality items that are associated with the attribute of the first object;

selecting the augmented reality item from the subset of augmented reality items associated with a highest rank; and automatically activating the selected augmented reality item that is associated with the highest rank.

19. A non-transitory machine-readable storage medium that includes instructions that, when executed by one or more processors of a machine, cause the machine to perform operations comprising:

receiving, via a messaging application, a request to scan an image captured by a camera of a user device, the image captured by the camera depicting a plurality of objects;

while the image is processed to identify the plurality of objects, receiving, from an object classifier, a first communication comprising a first identifier of a first object of the plurality of objects that is depicted in the image as each of the plurality of objects continues to be detected;

in response to receiving the first communication, displaying a list comprising the first identifier of the first object;

while the image continues to be processed after the first identifier is received, receiving, from the object classifier that generated the first communication, a second communication comprising a second identifier of a second object of the plurality of objects that is depicted in the image, the first and second communications being generated by the object classifier in response to the object classifier receiving and processing the image;

in response to receiving the second communication, updating the list to add the second identifier of the second object, the first and second identifiers comprising textual descriptions of the first and second objects, respectively;

determining an attribute of the first object depicted in the image;

identifying, from a plurality of augmented reality items, an augmented reality item that is associated with the attribute of the first object;

combining the identified augmented reality item with the image captured by the camera;

displaying, via the messaging application, the image captured by the camera combined with the identified augmented reality item; and displaying, on top of the image, a menu that comprises a plurality of augmented reality options for accessing each of a respective identified augmented reality item associated with the attribute of the first object.

20. The non-transitory machine-readable storage medium of claim 19, wherein the operations further comprise:

identifying a subset of augmented reality items that are associated with the attribute of the first object;

selecting the augmented reality item from the subset of augmented reality items associated with a highest rank; and automatically activating the selected augmented reality item that is associated with the highest rank.

* * * * *